No. 712,227.  
Patented Oct. 28, 1902.
H. W. WOLFF & A. LIPSCHUTZ.
WINDING SHAFT FOR CAR DOORS.
(Application filed May 12, 1902.)
(No Model.)
2 Sheets—Sheet 1.
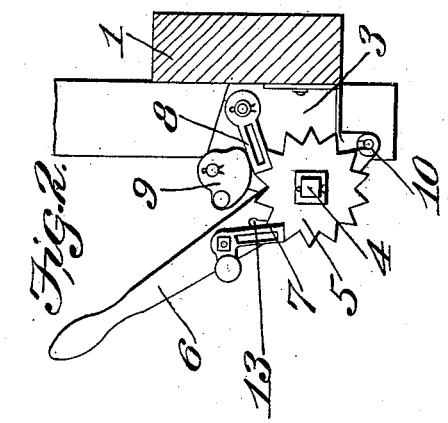
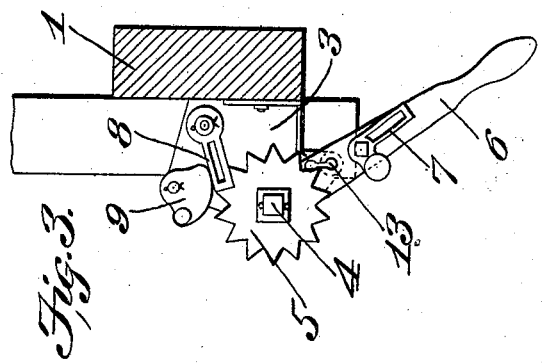
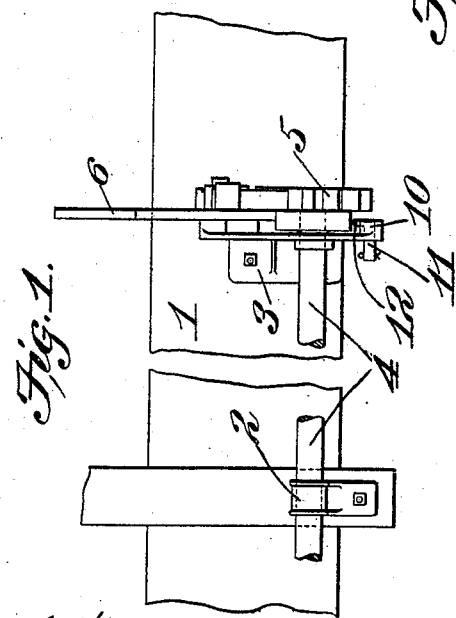
Witnesses:
Ralph M. Ashby
G. A. Pennington
Inventors:
Herbert W. Wolff,
Arthur Lipschutz,
by Bakewell & Cornwall
Attys.

No. 712,227. Patented Oct. 28, 1902.
H. W. WOLFF & A. LIPSCHUTZ.
WINDING SHAFT FOR CAR DOORS.
(Application filed May 12, 1902.)
(No Model.) 2 Sheets—Sheet 2.
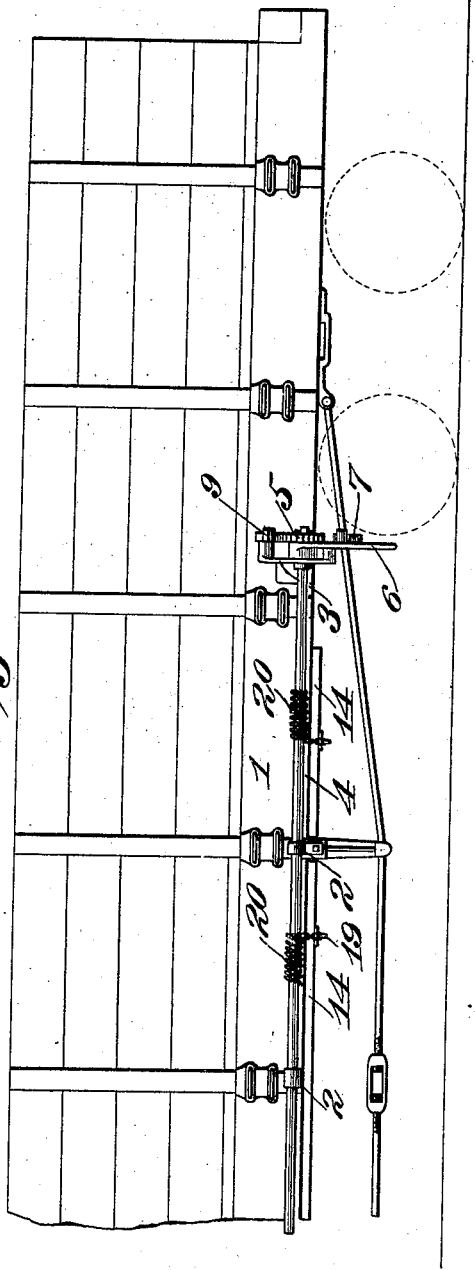
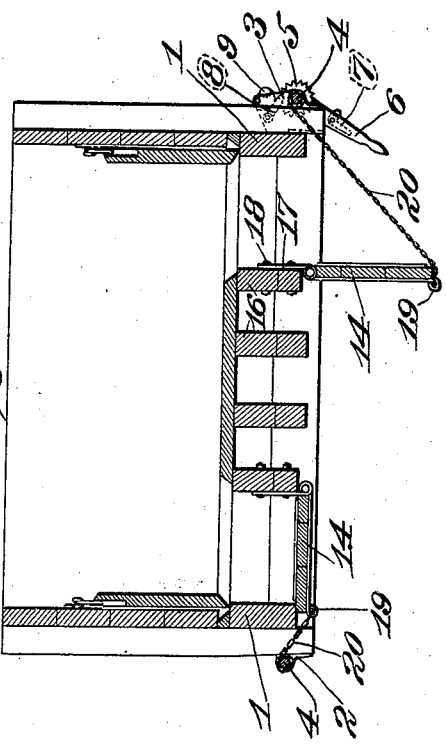
Witnesses:
Inventors:
Herbert W. Wolff,
Arthur Lipschutz,

UNITED STATES PATENT OFFICE.

HERBERT W. WOLFF AND ARTHUR LIPSCHUTZ, OF ST. LOUIS, MISSOURI, ASSIGNORS TO AMERICAN CAR & FOUNDRY COMPANY, OF ST. LOUIS, MISSOURI, A CORPORATION OF MISSOURI.

WINDING-SHAFT FOR CAR-DOORS.

SPECIFICATION forming part of Letters Patent No. 712,227, dated October 28, 1902.

Application filed May 12, 1902. Serial No. 106,940. (No model.)

*To all whom it may concern:*

Be it known that we, HERBERT W. WOLFF and ARTHUR LIPSCHUTZ, citizens of the United States, residing at St. Louis, Missouri, have invented a certain new and useful Improvement in Winding-Shafts for Car-Doors, of which the following is a full, clear, and exact description, such as will enable others skilled in the art to which it appertains to make and use the same, reference being had to the accompanying drawings, forming part of this specification, in which—

Figure 1 is a side elevational view showing our improved winding-shaft in position on a portion of the car. Fig. 2 is an end elevational view. Fig. 3 is a similar view showing the parts in a changed position. Fig. 4 is a side elevational view of a car with our invention attached thereto, one end of said car being broken away; and Fig. 5 is a general cross-sectional view of a car of the type illustrated in Fig. 4, showing one of the doors thereof open and one in a closed position.

This invention relates to a new and useful improvement in winding-shafts for car-doors, the object being to simplify the construction of devices of the character described and produce thereby a device which can be cheaply made and easily applied in position.

Our invention consists in the construction, arrangement, and combination of the several parts, all as will hereinafter be described and afterward pointed out in the claims.

In the drawings, 1 indicates a number of car-frames to which are secured suitable bearings 2 and 3, in which bearings is mounted the winding-shaft 4. Shaft 4 has an angular or non-circular end, upon which is arranged a ratchet-wheel 5. 6 is an operating-lever loosely mounted on the shaft 4 and carrying a weighted pawl 7, which coöperates with the teeth of ratchet 5.

8 is a detaining-pawl mounted in the bearing 3 and coöperating with the ratchet 5.

9 is a gravitating cam mounted in bearing 3 and coöperating with the detaining-pawl 8 to lock the same in position.

The bearing 3 is provided with a notched boss 10, in which is slidingly arranged a bolt 11, said bolt having an enlarged head 12, which is designed to be received in the notch in the boss and held in its retracted position.

The operating-lever 6 is provided with an opening 13, which when the lever is down, as shown in Fig. 3, registers with the bolt, and when said bolt is moved longitudinally its head is caused to pass through the opening in the lever, and upon turning said bolt the head is placed out of registration with the opening 13 and the operating-handle locked in its lowered position against accidental displacement. When the operating-handle is lowered, the pawl 7 is out of engagement with the ratchet 5.

The doors 14 are hinged to the bottom timbers 16 of the car by means of strap-hinges 17, secured thereto, the bolts 18 passing through the hinge and timbers. Said doors are provided at their outer free ends with rings 19 or any suitable equivalent means, to which are secured at one end the chains 20, which pass thence over and around the shaft 4, to which said chains are secured, so that upon rotation of said shaft in one direction the chains 20 will be wound thereon, thereby swinging the door 14 upon its hinge, raising and closing the same. It will be apparent that said shaft 4 is locked against rotation to lower the door when the pawl 8 and cam 9 are in the position shown in Fig. 2, and when the door 14 has reached a closed position said members occupy such position whereby the shaft 4 is held against rotation, and consequently said door 14 is locked. When it is desired to open the doors 14 for the purpose of dumping the load within the car, the weighted cam 9 is raised, the pawl 8 is swung on its pivot to release the end thereof from engagement with the ratchet, and the doors will drop by gravity to the position shown at the right in Fig. 5. When it is desired to close said doors and lock them in closed position, the pawl 8 is caused to bear on the said ratchet, leaving the cam 9 in its elevated or raised position, the handle 6 being manipulated to cause the pawl thereon to bear down upon the upper faces of the teeth of said ratchet, whereby movement downward of said handle will rotate said shaft 4, thereby winding thereon the chains 20 and closing the doors connected thereto, after which the cam 9 is turned down, so as to bear upon the upper face of said pawl 8, thereby locking it in position to bear against said ratchet 5 and prevent rotation thereof, after which the lever 6 may be locked in its lower position, as stated heretofore.

A shaft 4 may be arranged on each side of the car and each shaft provided with our improvement, or it may be connected only to one shaft and connection established between said shafts, whereby both will be rotated from one lever, if desired.

We are aware that many minor changes in the construction, arrangement, and combination of the several parts of our device can be made and substituted for those herein shown and described without in the least departing from the nature and principle of our invention.

Having thus described our invention, what we claim as new, and desire to secure by Letters Patent, is—

1. In a device of the character indicated, the combination with a winding-shaft and its ratchet, of an operating-handle carrying a pawl for coöperating with said ratchet, a bolt for locking said operating-handle in one of its positions, a pawl engaging said ratchet when said handle is locked, and a cam adapted to hold said pawl in engagement with said ratchet; substantially as described.

2. In a device of the character indicated, the combination with a winding-shaft and its ratchet, of an operating-handle loosely mounted on said shaft, a pawl carried by said handle, a bearing for said shaft, and a slidable bolt mounted in said bearing and provided with an enlarged head, said operating-handle being provided with an opening designed to register with said enlarged head, whereby when the bolt is introduced in said opening and rotated the handle is locked in position and the bolt prevented from accidental displacement; substantially as described.

3. In a device of the character indicated, the combination with a winding-shaft and its ratchet, of bearings for said shaft, a detaining-pawl coöperating with said ratchet, a gravitating cam coöperating with said detaining-pawl, an operating-handle, a gravitating pawl carried by said handle, said handle being also provided with an elongated opening, and a sliding bolt mounted in one of the bearings for the shaft, said sliding bolt being provided with an elongated head, whereby when said head is projected through the opening in the operating-handle and the bolt turned, the handle is locked in position and the bolt prevented from becoming displaced; substantially as described.

In testimony whereof we hereunto affix our signatures, in the presence of two witnesses, this 9th day of May, 1902.

HERBERT W. WOLFF.
ARTHUR LIPSCHUTZ.

Witnesses:
GEORGE BAKEWELL,
G. A. PENNINGTON.